US008837354B2

(12) United States Patent
Raravi et al.

(10) Patent No.: US 8,837,354 B2
(45) Date of Patent: Sep. 16, 2014

(54) APPARATUS AND METHOD FOR SUPPORTING WIRELESS ACTUATORS AND OTHER DEVICES IN PROCESS CONTROL SYSTEMS

(75) Inventors: Channabasavaraj Raravi, Hospet (IN); Alexander Chernoguzov, Warrington, PA (US); Ramakrishna S. Budampati, Maple Grove, MN (US); Soumitri N. Kolavennu, Blaine, MN (US); Christopher Pulini, Conshohocken, PA (US)

(73) Assignee: Honeywell International Inc., Morristown, NJ (US)

( * ) Notice: Subject to any disclaimer, the term of this patent is extended or adjusted under 35 U.S.C. 154(b) by 443 days.

(21) Appl. No.: 12/624,151

(22) Filed: Nov. 23, 2009

(65) Prior Publication Data
US 2010/0272093 A1    Oct. 28, 2010

Related U.S. Application Data

(60) Provisional application No. 61/172,504, filed on Apr. 24, 2009.

(51) Int. Cl.
*H04B 7/212* (2006.01)
*H04L 1/18* (2006.01)
*H04L 1/00* (2006.01)

(52) U.S. Cl.
CPC ....... *H04L 1/1887* (2013.01); *H04L 2001/0093* (2013.01)
USPC .......................................................... 370/328

(58) Field of Classification Search
None
See application file for complete search history.

(56) References Cited

U.S. PATENT DOCUMENTS

| 4,679,189 | A | 7/1987 | Olson et al. |
| 5,537,414 | A | 7/1996 | Takiyasu et al. |
| 5,898,826 | A | 4/1999 | Pierce et al. |
| 7,031,308 | B2 | 4/2006 | Garcia-Luna-Aceves et al. |
| 7,035,937 | B2 | 4/2006 | Haas et al. |
| 7,203,743 | B2 | 4/2007 | Shah-Heydari |
| 7,620,409 | B2 | 11/2009 | Budampati et al. |
| 2002/0072329 | A1 | 6/2002 | Bandeira et al. |
| 2002/0176396 | A1 | 11/2002 | Hammel et al. |
| 2004/0174829 | A1 | 9/2004 | Ayyagari |
| 2004/0259533 | A1 | 12/2004 | Nixon et al. |
| 2005/0201349 | A1 | 9/2005 | Budampati |
| 2005/0281215 | A1* | 12/2005 | Budampati et al. ........... 370/328 |
| 2006/0002368 | A1 | 1/2006 | Budampati et al. |

(Continued)

OTHER PUBLICATIONS

Dr. Soumitri Kolavennu, Presentation, "WNSIA MAC Layer", ISA SP100 meeting, Feb. 14, 2007, 24 pages.

(Continued)

*Primary Examiner* — Jae Y Lee
*Assistant Examiner* — Alan Lindenbaum

(57) ABSTRACT

A system includes a wireless leaf node configured to modify operation of an industrial process. The system also includes a plurality of wireless access points configured to transmit data to the wireless leaf node in specified time slots and to receive an acknowledgement from the wireless leaf node in response to successful receipt of the data by the wireless leaf node. Various communication schemes are disclosed for supporting communications between the wireless leaf node and the access points. Each access point could also include a local slot manager configured to assign the specified time slots for that access point to communicate with the wireless leaf node. The wireless leaf node could represent a wireless actuator.

20 Claims, 6 Drawing Sheets

(56) References Cited

U.S. PATENT DOCUMENTS

| | | |
|---|---|---|
| 2006/0039347 A1 | 2/2006 | Nakamura et al. |
| 2006/0104301 A1* | 5/2006 | Beyer et al. .................... 370/445 |
| 2006/0128349 A1 | 6/2006 | Yoon |
| 2006/0171344 A1 | 8/2006 | Subramanian et al. |
| 2006/0171346 A1 | 8/2006 | Kolavennu et al. |
| 2006/0227729 A1* | 10/2006 | Budampati et al. ........... 370/278 |
| 2006/0256740 A1 | 11/2006 | Koski |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0155423 A1 | 7/2007 | Carmody et al. |
| 2008/0043637 A1 | 2/2008 | Rahman |
| 2008/0267259 A1 | 10/2008 | Budampati et al. |
| 2008/0273547 A1* | 11/2008 | Phinney ........................ 370/437 |
| 2009/0022121 A1 | 1/2009 | Budampati et al. |
| 2009/0034441 A1* | 2/2009 | Budampati et al. ........... 370/310 |
| 2009/0109889 A1 | 4/2009 | Budampati et al. |

OTHER PUBLICATIONS

Ying Zhang, et al., "A Learning-based Adaptive Routing Tree for Wireless Sensor Networks", Journal of Communications, vol. 1, No. 2, May 2006, p. 12-21.

Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.

Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Patrick S. Gonia, "System and Method for Time Synchronization in a Wireless Network", U.S. Appl. No. 12/464,030, filed May 11, 2009.

* cited by examiner

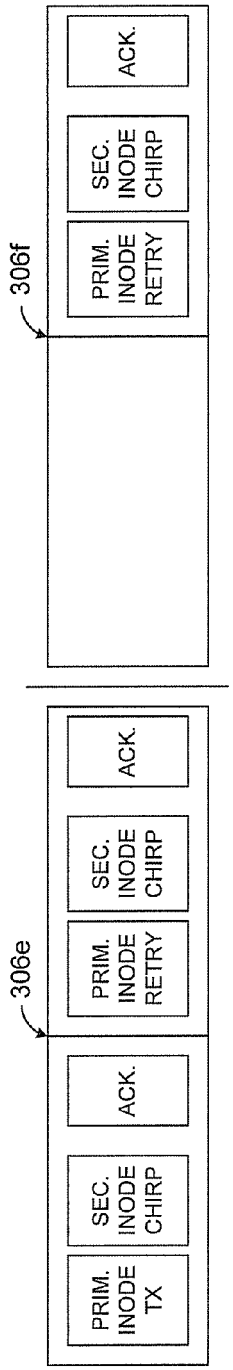
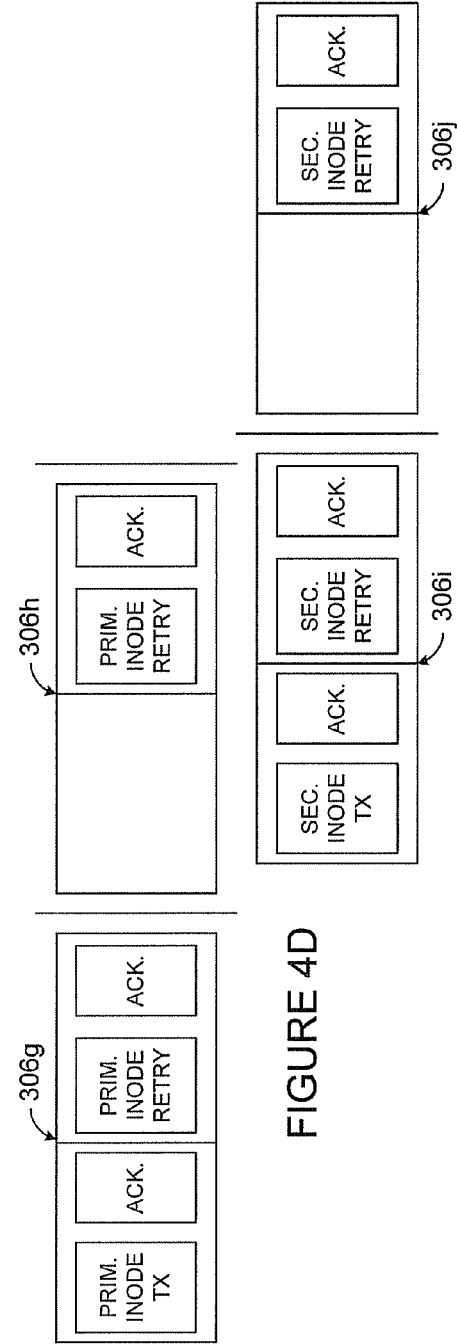
FIGURE 4C
FIGURE 4D

APPARATUS AND METHOD FOR SUPPORTING WIRELESS ACTUATORS AND OTHER DEVICES IN PROCESS CONTROL SYSTEMS

CROSS-REFERENCE TO RELATED APPLICATIONS

This application claims priority under 35 U.S.C. §119(e) to U.S. Provisional Application No. 61/172,504 filed on Apr. 24, 2009, which is hereby incorporated by reference.

TECHNICAL FIELD

This disclosure relates generally to industrial automation and control systems. More specifically, this disclosure relates to an apparatus and method for supporting wireless actuators and other devices in process control systems.

BACKGROUND

In industrial automation and control applications, wireless networks have been widely deployed to support sensing and monitoring of industrial processes. These networks allow industrial processes to be monitored using wireless sensors without incurring the costs typically associated with wired devices. However, wireless networks are often only used for sensing or monitoring applications in industrial automation and control systems. This means that the wireless networks are often used to collect input data from various sensor devices. Wireless networks are often not used with wireless actuator devices or other control devices in industrial automation and control systems. This means that the wireless networks are not often used to provide output data to various control devices.

SUMMARY

This disclosure provides an apparatus and method for supporting wireless actuators and other devices in process control systems.

In a first embodiment, a system includes a wireless leaf node configured to modify operation of an industrial process. The system also includes a plurality of wireless access points configured to transmit data to the wireless leaf node in specified time slots and to receive an acknowledgement from the wireless leaf node in response to successful receipt of the data by the wireless leaf node.

In a second embodiment, an access point includes at least one transceiver configured to transmit data to a wireless leaf node that is configured to modify operation of an industrial process. The access point also includes a controller configured to initiate transmission of the data to the wireless leaf node in specified time slots. The controller is configured to identify the specified time slots in cooperation with a second access point that is configured to transmit the data to the wireless leaf node. The at least one transceiver is also configured to receive an acknowledgement from the wireless leaf node in response to successful receipt of the data by the wireless leaf node.

In a third embodiment, a method includes receiving data from multiple access points at a wireless leaf node in an industrial control and automation system during one or more first time slots. The method also includes transmitting an acknowledgement to the multiple access points and modifying operation of an industrial process based on the received data. The method further includes identifying a readback value associated with the modified operation of the industrial process. In addition, the method includes transmitting a message containing the readback value to the multiple access points during one or more second time slots.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4A through 4E illustrate example communication schemes supporting communications with a wireless actuator or other output device according to this disclosure;

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
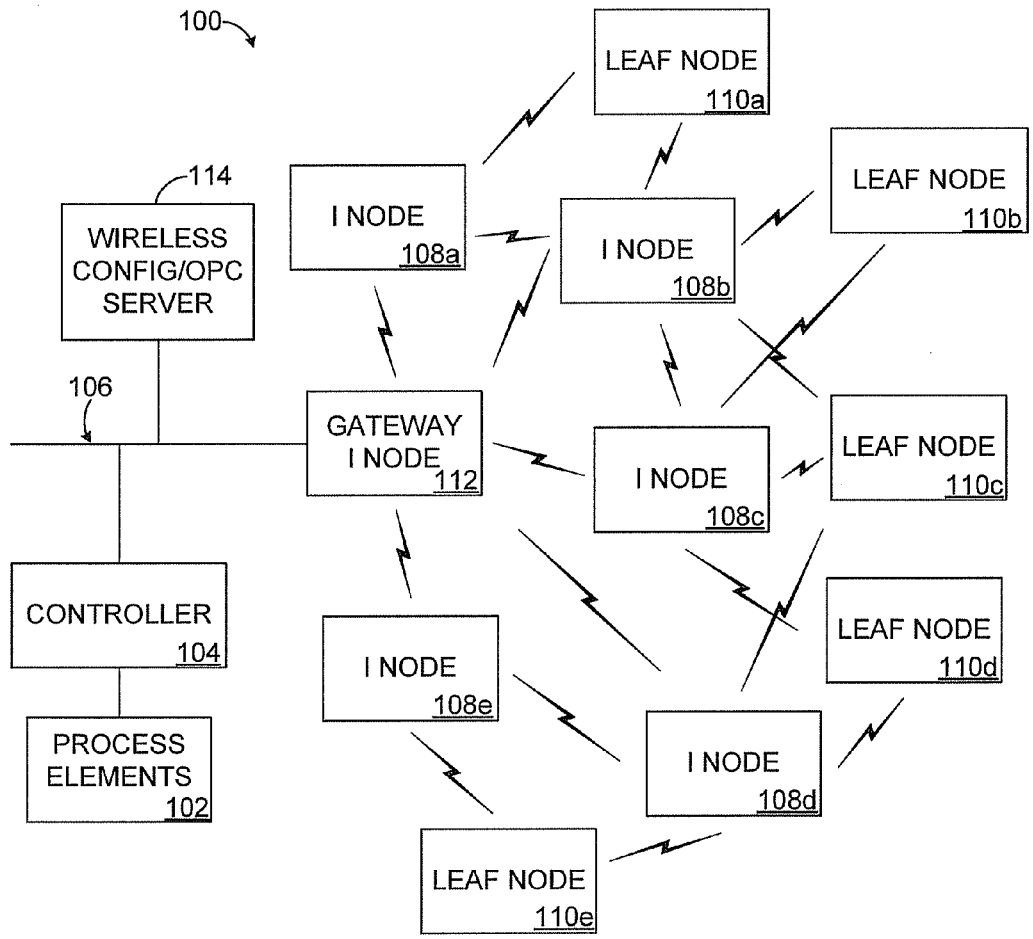
FIG. 1 illustrates an example industrial control and automation system supporting the use of wireless actuators and other output devices according to this disclosure.

FIG. 1 illustrates an example industrial control and automation system 100 supporting the use of wireless actuators and other output devices according to this disclosure. In this example embodiment, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the industrial control and automation system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the infrastructure nodes 108a-108e form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent routing devices that can store and forward messages for other devices. Infrastructure nodes 108a-108e are typically line-powered devices, meaning these nodes receive operating power from an external source. Infrastructure nodes 108a-108e are typically not limited in their operations since they need not minimize power consumption to increase the operational life of their internal power supplies. On the other hand, the leaf nodes 110a-110e are generally non-routing devices that do not store and forward messages for other devices (although they could). Leaf nodes 110a-110e typically represent devices powered by local power supplies, such as nodes that receive operating power from internal batteries or other internal power supplies. Leaf nodes 110a-110e are often more limited in their operations in order to help preserve the operational life of their power supplies.

The nodes 108a-108e and 110a-110e include any suitable structures facilitating wireless communications, such as radio frequency (RF) frequency-hopping spread spectrum (FHSS) or direct sequence spread spectrum (DSSS) transceivers. The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the wireless network. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices. The infrastructure nodes 108a-108e may also include any of the functionality of the leaf nodes 110a-110e or the controller 104.

The gateway infrastructure node 112 communicates wirelessly with, transmits data to, and receives data from one or more infrastructure nodes and possibly one or more leaf nodes. The gateway infrastructure node 112 may also convert data between protocol(s) used by the network 106 and protocol(s) used by the nodes 108a-108e and 110a-110e. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In particular embodiments, each leaf node could communicate with a redundant pair of infrastructure nodes. One infrastructure node may be referred to as the "primary infrastructure node" or "primary INode." The other infrastructure node may be referred to as the "secondary infrastructure node" or "secondary INode."

A wireless configuration and OLE for Process Control (OPC) server 114 can configure and control various aspects of the system 100. For example, the server 114 could configure the operation of the nodes 108a-108e, 110a-110e, and 112. The server 114 could also support security in the system 100, such as by distributing cryptographic keys or other security data to various components in the system 100 (like the nodes 108a-108e, 110a-110e, and 112). The server 114 includes any hardware, software, firmware, or combination thereof for configuring wireless networks and providing security information.

In particular embodiments, the various nodes in the wireless network of FIG. 1 form a mesh network communicating at 2.4 GHz or 5.8 GHz. Also, in particular embodiments, data can be injected into the wireless mesh network through the infrastructure nodes or leaf nodes. This can therefore provide versatile, multifunctional, plant-wide coverage for wireless sensing, asset location tracking, personnel tracking, wireless communications, and any other or additional functionality as desired.

In one aspect of operation, the infrastructure nodes 108a-108e and gateway infrastructure node 112 can support the use of wireless actuators and other output devices (as various leaf nodes 110a-110e) in a wireless network. Moreover, this can be done in a manner that supports effective communications while reducing or minimizing power consumption by the wireless actuators and other output devices.

As described below, various features can be used or supported in the system 100 for communicating with wireless actuators and other output devices. For example, redundant infrastructure nodes or other access points could be used to publish data to a wireless actuator. Also, a single acknowledgement could be transmitted from the wireless actuator, which can help to reduce power consumption by the wireless actuator. In addition, communications with wireless sensors, wireless actuators, and other devices could occur using a common time slot structure. Various other or additional features of a wireless network supporting the use of wireless actuators and other output devices are described below.

Although FIG. 1 illustrates one example of an industrial control and automation system 100, various changes may be made to FIG. 1. For example, the system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where the use of wireless actuators and other output devices can be supported. This functionality could be used with any suitable device or system.

Figure 2:
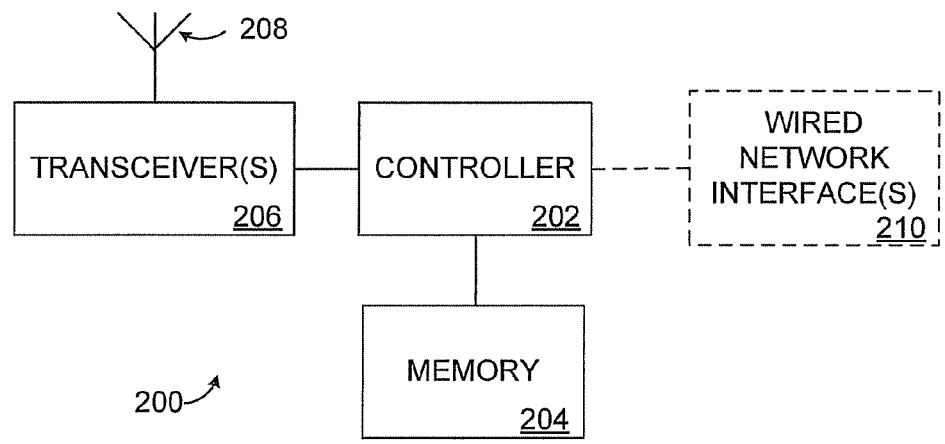
FIG. 2 illustrates an example wireless node in an industrial control and automation system according to this disclosure.

FIG. 2 illustrates an example wireless node 200 in an industrial control and automation system according to this disclosure. The wireless node 200 could, for example, represent a leaf node (such as a wireless actuator or other output device), infrastructure node, or gateway infrastructure node in the system 100 of FIG. 1 or other system.

As shown in FIG. 2, the node 200 includes a controller 202. The controller 202 controls the overall operation of the node 200. For example, the controller 202 may receive or generate data to be transmitted externally, and the controller 202 could provide the data to one or more other components in the node 200 for transmission over a wired or wireless network. The controller 202 could also receive data over a wired or wireless network and use or pass on the data.

As particular examples, the controller 202 in a sensor leaf node could provide sensor data for transmission, and the controller 202 in an actuator leaf node could receive and implement control signals (note that a leaf node could represent a combined sensor-actuator device). As another example, the controller 202 in an infrastructure node could receive data transmitted wirelessly, determine a next hop for the data (if any), and provide the data for transmission to the next hop (if any). As a third example, the controller 202 in a gateway infrastructure node 112 could receive data from a wired network and provide the data for wireless transmission (or vice versa). The controller 202 could perform any other or additional functions to support the operation of the node 200.

The controller 202 includes any suitable hardware, software, firmware, or combination thereof for controlling the operation of the node 200. As particular examples, the controller 202 could represent a processor, microprocessor, microcontroller, field programmable gate array (FPGA), or other processing or control device.

A memory 204 is coupled to the controller 202. The memory 204 stores any of a wide variety of information used, collected, or generated by the node 200. For example, the memory 204 could store information received over one network that is to be transmitted over the same or different network. The memory 204 includes any suitable volatile and/or non-volatile storage and retrieval device or devices.

The node 200 also includes one or more wireless transceivers 206 coupled to one or more antennas 208. The transceiver(s) 206 and antenna(s) 208 can be used by the node 200 to communicate wirelessly with other devices. For example, in a leaf node, the transceiver(s) 206 and antenna(s) 208 can be used to communicate with infrastructure nodes. In an infrastructure node or gateway infrastructure node, the transceiver(s) 206 and antenna(s) 208 can be used to communicate with leaf nodes, other infrastructure nodes or gateway infrastructure nodes, or WiFi or other devices (such as wireless controllers or hand-held user devices). Each transceiver 206 may be coupled to its own antennas 208, or multiple transceivers 206 can share a common antenna 208. Each transceiver 206 includes any suitable structure for generating signals to be transmitted wirelessly and/or receiving signals received wirelessly. In some embodiments, each transceiver 206 represents an RF transceiver. Note that each transceiver could include a transmitter and a separate receiver. Also, each antenna 208 could represent an RF antenna (although any other suitable wireless signals could be used to communicate).

If the node 200 represents a gateway infrastructure node, the node 200 may further include one or more wired network interfaces 210. The wired network interfaces 210 allow the node 200 to communicate over one or more wired networks, such as the network 106. Each wired network interface 210 includes any suitable structure for transmitting and/or receiving signals over a wired network, such as an Ethernet interface.

In some embodiments, the node 200 may represent a wireless actuator, or the node 200 may represent an infrastructure or gateway infrastructure node capable of communicating with a wireless actuator. Communications between a wireless actuator or other output device and an infrastructure node may occur as described below.

Although FIG. 2 illustrates one example of a wireless node 200 in an industrial control and automation system, various changes may be made to FIG. 2. For example, various components in FIG. 2 could be combined, subdivided, or omitted and additional components could be added according to particular needs. Also, in general, a "wireless node" may represent any device that can transmit and/or receive data wirelessly (even if the "wireless node" has the ability to transmit and/or receive data over a wired connection, as well).

Figure 3:
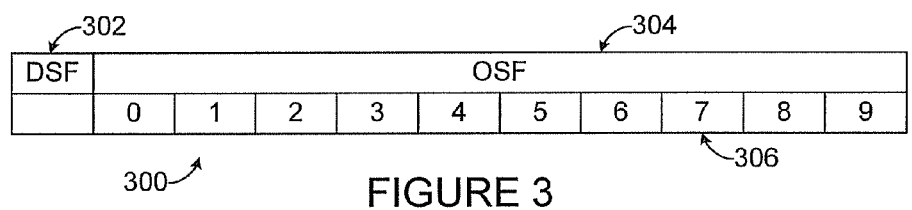
FIG. 3 illustrates an example frame containing time slots used for communications between nodes in an industrial control and automation system according to this disclosure.

FIG. 3 illustrates an example frame 300 containing time slots used for communications between nodes in an industrial control and automation system according to this disclosure. As noted above, communications with a wireless actuator or other output device could occur using the same time slot structure used to communicate with wireless sensors and other input devices. The example frame 300 shown in FIG. 3 includes time slots that are used for communications between infrastructure and leaf nodes (including both input and output leaf nodes).

In some embodiments, communications between nodes in a wireless network could occur as follows. A hyperperiod can be defined as a thirty second (or other) periodic cycle. Within each hyperperiod are repeating frames, an example of which is shown in FIG. 3. A frame 300 could, for example, represent a 250 millisecond frame. Within each frame 300 is a discovery subframe (DSF) 302 (which occupies the first 11 milliseconds of the frame 300) and an operation subframe (OSF) 304 (which occupies the remainder of the frame 300). The operation subframe 304 is divided into time slots 306 (such as ten slots).

Communications with an actuator leaf node or other output device may occur during multiple instances of the frame 300. Additional details regarding the use of wireless actuators and other output devices in a wireless network of an industrial control and automation system are provided below. Note that the use of time slots can help to provide deterministic communications with a leaf node since, for example, communications with the leaf node will occur during specific times.

Although FIG. 3 illustrates one example of a frame 300 containing time slots used for communications between nodes in an industrial control and automation system, various changes may be made to FIG. 3. For example, communications with an actuator leaf node or other output device could occur using any other suitable communication protocol.

FIGS. 4A through 4E illustrate example communication schemes supporting communications with a wireless actuator or other output device according to this disclosure. As noted above, one objective in the system 100 is to provide support for actuator field devices and other output devices in a wireless network. This functionality can be supported by providing the infrastructure nodes 108a-108e, 112 with the ability to publish data to output leaf nodes. For example, each infrastructure and gateway infrastructure node could have a medium access control (MAC) layer designed to support "output publish slots" for providing data to the output leaf nodes and "input publish slots" for receiving data from the output leaf nodes. This functionality can support the use of infrastructure node duocast or multicast, meaning multiple infrastructure nodes can transmit data to the same output leaf node. Among other things, this can help to increase or maximize system capacity, increase or maximize data payload sizes, and be implemented easily in a wireless network.

Figure 4A:
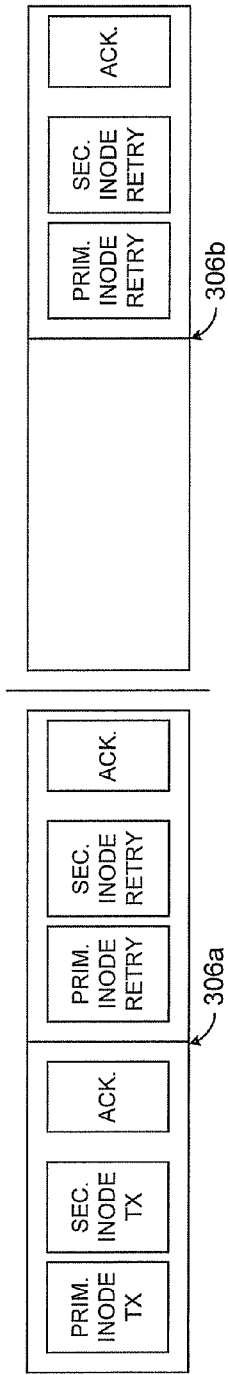

In FIG. 4A, two infrastructure nodes and an output leaf node communicate using a data-data-acknowledgement scheme. This scheme uses two adjacent time slots 306a-306b in a frame 300. In the first half of the time slot 306a, a primary infrastructure node transmits a data message to a leaf node, and then a secondary infrastructure node transmits the data message to the leaf node. Ideally, an acknowledgement (ACK) is received from the leaf node, and the data message is not transmitted again. If no acknowledgement is received, the primary and secondary infrastructure nodes retransmit the data message in the second half of the time slot 306a. If no acknowledgement is received, the primary and secondary infrastructure nodes again retransmit the data message in the second half of the following time slot 306b. This approach supports infrastructure node duocast within a single time slot.

Figure 4B:
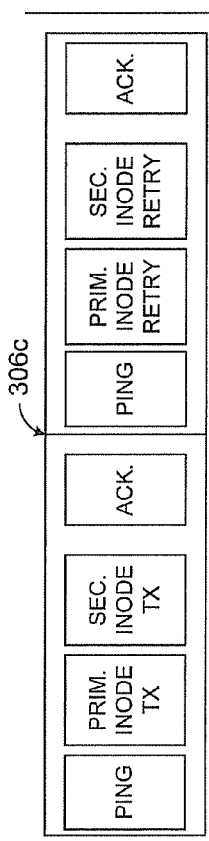

In FIG. 4B, two infrastructure nodes and an output leaf node communicate using a ping-data-data-acknowledgement scheme. This scheme uses two adjacent time slots 306c-306d in a frame 300. In the first half of the time slot 306c, a leaf node transmits a ping to primary and secondary infrastructure nodes. In response, the primary and secondary infrastructure nodes transmit a data message to the leaf node. If an acknowledgement is received, the data message is not transmitted again. If no acknowledgement is received, the leaf node transmits another ping in the second half of the time slot 306c, and the primary and secondary infrastructure nodes retransmit the data message. If no acknowledgement is received, the leaf node transmits a third ping in the second half of the following time slot 306d, and the primary and secondary infrastructure nodes retransmit the data message again. This approach supports infrastructure node duocast within a single time slot. This approach may also simplify implementation of the leaf node's MAC layer since all leaf node publication slots may begin with the leaf node sending a ping.

In FIG. 4C, two infrastructure nodes and an output leaf node communicate using a data-chirp-acknowledgement scheme. This scheme uses two adjacent time slots 306e-306f in a frame 300. In the first half of the time slot 306e, a primary infrastructure node transmits a data message to a leaf node, and a secondary infrastructure node transmits a chirp or dummy message to the leaf node. If no acknowledgement is received, the primary and secondary infrastructure nodes retransmit the data message and the chirp/dummy message in the second half of the time slot 306e. If no acknowledgement is received, the primary and secondary infrastructure nodes again retransmit the data message and the chirp/dummy message in the second half of the following time slot 306f. This approach supports single slot allocation but allows for larger data payloads in the data message (since the chirp/dummy message is shorter than a complete data message).

In FIG. 4D, two infrastructure nodes and an output leaf node communicate using a separate data-acknowledgement scheme for the infrastructure nodes. This scheme uses four adjacent time slots 306g-306j in a frame 300. In the first half of the time slot 306g, a primary infrastructure node transmits a data message to a leaf node. If no acknowledgement is received, the primary infrastructure node retransmits the data message in the second half of the time slot 306g. If no acknowledgement is received again, the primary infrastructure node again retransmits the data message in the second half of the following time slot 306h. If no acknowledgement is received, the same process is repeated using the secondary infrastructure node in the time slots 306i and 306j. This approach supports larger data payloads in the data messages.

Figure 4E:
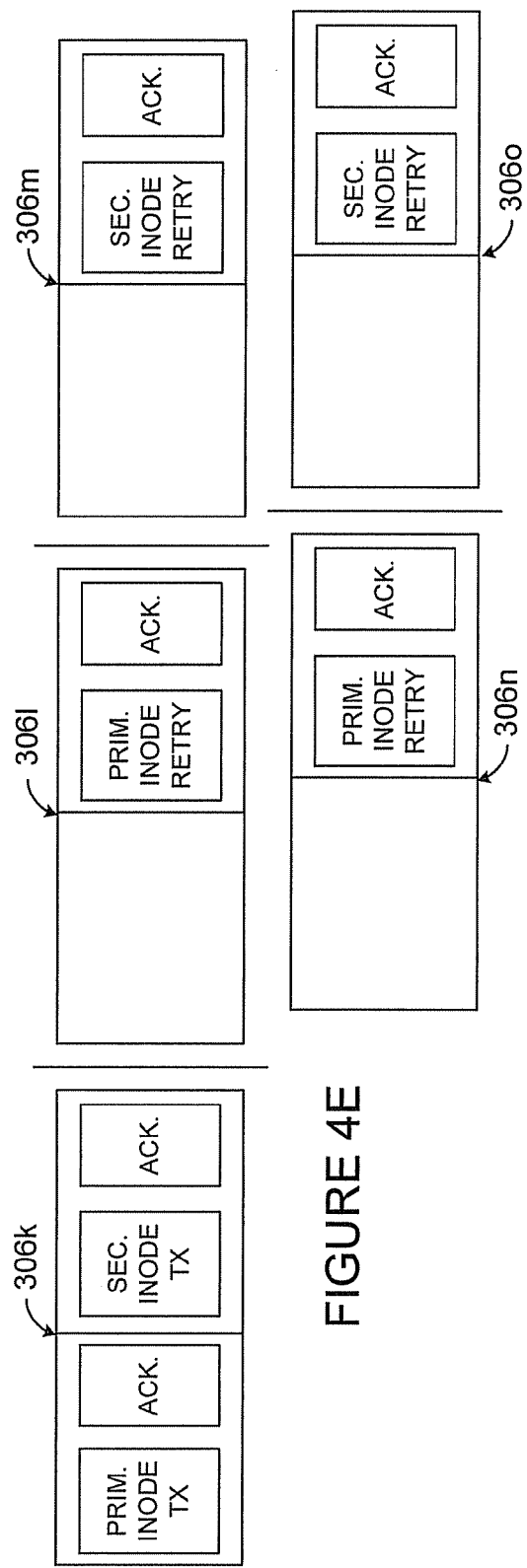

In FIG. 4E, two infrastructure nodes and an output leaf node communicate using a data-acknowledgement scheme. This scheme uses five adjacent time slots 306k-306o in a frame 300. In the first half of the time slot 306k, a primary infrastructure node transmits a data message to a leaf node and awaits an acknowledgement. In the second half of the time slot 306k, a secondary infrastructure node transmits the data message to the leaf node and awaits an acknowledgement. If no acknowledgement is received, the primary infrastructure node retransmits the data message in the second half of the following time slot 306l. If no acknowledgement is received, the secondary infrastructure node retransmits the data message in the second half of the following time slot 306m. If no acknowledgement is received, the same process is repeated using the primary and secondary infrastructure nodes in the time slots 306n and 306o. This approach supports infrastructure node duocast within a single time slot while also supporting larger data payloads in the data messages.

Any of these approaches could be used to support communications between infrastructure nodes and actuator or other output leaf nodes in the system 100 of FIG. 1. Also, different approaches could be used to support communications with different leaf nodes. In addition, if an infrastructure node has multiple messages to be transmitted to a leaf node, the specific message sent to the leaf node during a time slot could be selected in any suitable manner, such as by using a class or priority associated with the messages. As a particular example, an infrastructure node could support the use of a longest connected queue (LCQ) technique, where a message from the queue with the most waiting messages is transmitted.

Referring back to FIG. 3 in conjunction with FIGS. 4A through 4E, in particular embodiments, the infrastructure nodes may operate as follows. During the DSF 302, an infrastructure node can use its own DSF frequency-hopping pattern to listen for beacons from new leaf nodes or to receive event reports from current leaf nodes.

Each time slot 306 of the OSF 304 could be divided into a first sub-slot and a second sub-slot. During the first sub-slot of a time slot 306, the infrastructure node could (in order of priority):

switch to a leaf node's frequency-hopping pattern to receive data from or transmit data to the leaf node; and use its own OSF frequency-hopping pattern to listen for new leaf nodes.

During the second sub-slot of a time slot 306, the infrastructure node could (in order of priority):

switch to a leaf node's frequency-hopping pattern to receive a retransmission of data from the leaf node or to retransmit data to the leaf node (for retransmissions associated with the first sub-slot of the current time slot 306);

use its OSF frequency-hopping pattern to transmit an event response to a leaf node;

use its OSF frequency-hopping pattern to engage in an ongoing or pending conversion with a leaf node;

switch to a leaf node's frequency-hopping pattern to receive a retransmission of data from the leaf node or to retransmit data to the leaf node (for retransmissions associated with a prior time slot 306); and use its own OSF frequency-hopping pattern to listen for new leaf nodes or event reports from current leaf nodes.

Note that if the infrastructure node is engaged in multiple conversations with multiple leaf nodes, it could order these conversations in a FIFO manner. Also, after two unsuccessful attempts to reach a leaf node, the infrastructure node can drop its conversation with that leaf node or postpone the conversation until the next periodic OSF slot of that leaf node and proceed to the next leaf node in the FIFO queue.

Also note that the priority order given above can help to resolve contentions regarding the use of a time slot. For example, consider the time slot 306*f* in FIG. 4C. In this example, the primary infrastructure node may transmit a first data message in the time slot 306*e* and a second data message in the first half of the time slot 306*f*. If neither data message is received, the second half of the time slot 306*f* could be used for the second retransmission of the first data message or the first retransmission of the second data message. In the priority order given above, the infrastructure node would resolve this contention in favor of the first retransmission of the second data message. However, other priority orders could also be used to resolve contentions.

Further note that various metrics could be collected by one or more components in the system 100. These metrics could include statistics for input and output data coming from and going to a leaf node. As particular examples, this could include measuring the percentage of successful primary infrastructure node transmissions to a leaf node, the percentage of successful secondary infrastructure node transmissions to the leaf node, the number of first retransmissions sent to the leaf node, and the number of second retransmissions sent to the leaf node. These metrics could be used in any suitable manner, such as to identify problematic infrastructure or leaf nodes or to identify areas where additional infrastructure nodes may be needed to provide improved wireless coverage.

Although FIGS. 4A through 4E illustrate examples of communication schemes supporting communications with a wireless actuator or other output device, various changes may be made to FIGS. 4A through 4E. For example, other schemes could be used to support communications with a wireless actuator or other output device.

Figure 5:
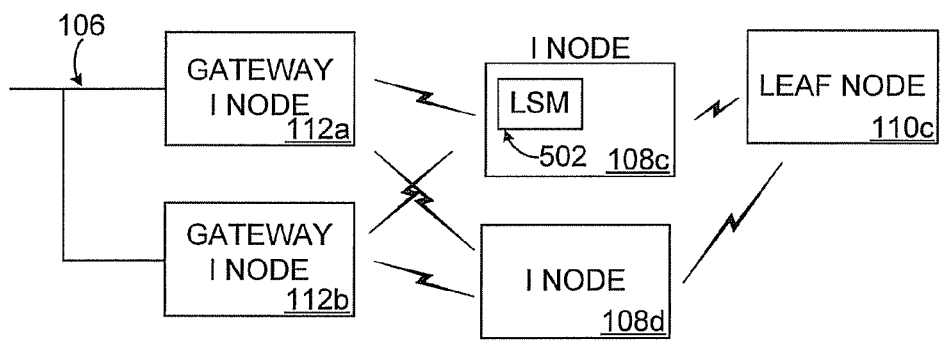
FIG. 5 illustrates redundant communication paths supporting communications with a wireless actuator or other output device according to this disclosure.

FIG. 5 illustrates redundant communication paths supporting communications with a wireless actuator or other output device according to this disclosure. Messages can be routed from a gateway infrastructure node to one or more infrastructure nodes, such as by routing a CCQ message to both primary and secondary infrastructure nodes. However, message routing can become more complicated at the network layer due to failure scenarios. For example, in FIG. 5, two gateway infrastructure nodes 112*a*-112*b* can function as a redundant pair of gateways. Each redundant gateway infrastructure node 112*a*-112*b* may send a data message to both the primary and secondary infrastructure nodes, such as infrastructure nodes 108*c* and 108*d*. Any partial or full link failures can be handled at the network layer of the infrastructure nodes and the gateway infrastructure nodes. For instance, routing tables can be updated during the course of a link failure scenario.

At the security layer, each leaf node could receive data from the same gateway to which it is publishing data, so only one session key may be needed. In some embodiments, the formation of the security session can occur when the leaf node starts publishing initial readback values. For an actuator leaf node, commands can be issued to change a setting of the actuator, and a readback value represents the actuator transmitting back its current setting. This allows a controller or other external device or system to verify proper operation of the actuator.

In addition, each infrastructure and gateway infrastructure node can include a local slot manager (LSM) 502. The local slot manager 502 can be used by an infrastructure or gateway infrastructure node to assign time slots to actuator leaf nodes and other output devices. It may be assumed that output devices publish readback values and have separate slot allocations for input and output values (although this need not be the case). Also, there may be no need to support different duty cycles for input and output slot allocations for the same output device (although this could be supported). Further, the gateway infrastructure node that sends data to a leaf node may be the same gateway infrastructure node that receives the leaf node's data so only one security session is needed.

Slot allocation performed by the local slot manager 502 can commence when a leaf node tries to publish data to its gateway infrastructure node. The local slot manager 502 could support various slot allocation schemes. In some embodiments, input and output slot requests for a leaf node can be combined into a single multi-slot request. The local slot manager 502 could receive a multi-slot request from a leaf node and assign both uplink and downlink time slots to the leaf node. This allows the leaf node's slot requests to be handled at the same time. Infrastructure and gateway infrastructure nodes could also communicate to help ensure that the same primary and secondary infrastructure nodes are selected for uplink and downlink time slots.

In other embodiments, requests for the uplink and downlink time slots are handled separately. One of the requests is received, and time slots for primary and secondary infrastructure nodes are selected. When the next request is received, time slots can be assigned in the same primary and secondary infrastructure nodes. This can help to ensure that the leaf node communicates with the same two infrastructure nodes in both the upstream and downstream directions.

In this way, each infrastructure node's local slot manager 502 can be enhanced to assign time slots to leaf nodes and know whether a slot is an input slot or an output slot. Also, each local slot manager 502 is able to handle multiple slot allocations for the same leaf node. Further, there can be cooperation between the primary and secondary infrastructure nodes so that both infrastructure nodes assign the proper time slots to a leaf node, such as to support any of the communication schemes shown in FIGS. 4A through 4E. In particular embodiments, an output queue (with a size equal to one data message) can be allocated by the local slot manager 502 for all output time slots.

The local slot manager 502 includes any hardware, software, firmware, or combination thereof for assigning an infrastructure node's time slots for communications with leaf nodes. The local slot manager 502 could, for example, represent one or more software or firmware applications executed by the controller 202 in an infrastructure or gateway infrastructure node.

Although FIG. 5 illustrates examples of redundant communication paths supporting communications with a wireless actuator or other output device, various changes may be made to FIG. 5. For example, any number of redundant gateway infrastructure nodes could be used, or a single gateway infrastructure node could be used. Also, a slot manager need not reside in each infrastructure node, and a more global slot manager could be used instead of or in addition to the local slot managers.

Figure 6:
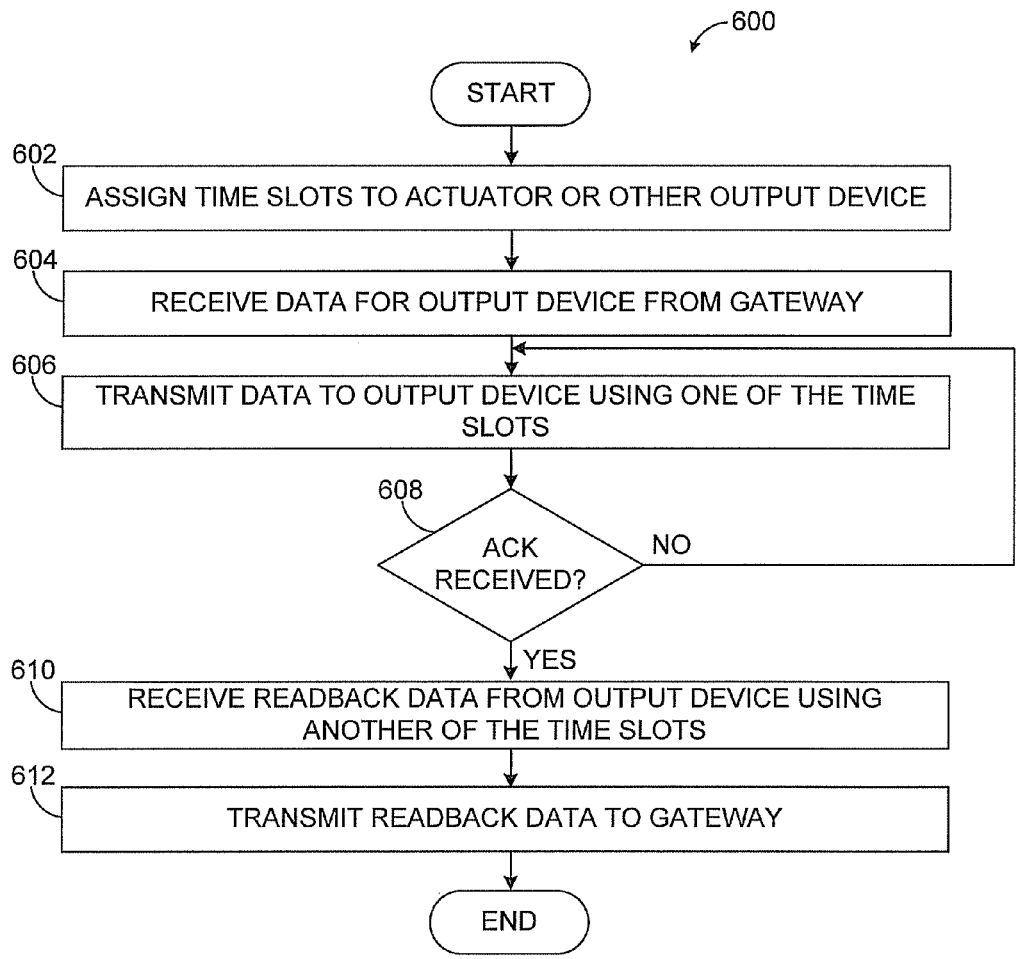
FIG. 6 illustrates an example method for communicating with a wireless actuator or other output device in an industrial control and automation system according to this disclosure.

FIG. 6 illustrates an example method 600 for communicating with a wireless actuator or other output device in an industrial control and automation system according to this disclosure. As shown in FIG. 6, time slots are assigned to an actuator or other wireless output device at step 602. This could include, for example, assigning a time slot to be used for transmissions to the output device and a time slot to be used for transmissions from the output device. As a particular example, this could be done by an infrastructure node that acts as the primary or secondary infrastructure node for the output device.

Data for the output device is received from a gateway at step 604. This could include, for example, the primary and secondary infrastructure nodes receiving the data from a gateway infrastructure node. The data is transmitted to the output device using one of the time slots at step 606. This could include, for example, one or both of the primary and secondary infrastructure nodes transmitting a data message to the output device. If no acknowledgement is received at step 608, the method returns to step 606 to retransmit the data to the output device in a different time slot. Any number of retransmissions could be attempted, such as two retransmissions. The output device can transmit only a single acknowledgement regardless of the number of successful transmissions it receives, which can be received by both the primary and secondary infrastructure nodes.

If an acknowledgement is received at step 608, readback data from the output device is received during another of the time slots at step 610, and the readback data is transmitted to the gateway at step 612. This could include, for example, one or both of the primary and secondary infrastructure nodes receiving the readback data and transmitting the data to the gateway infrastructure node.

Although FIG. 6 illustrates one example of a method 600 for communicating with a wireless actuator or other output device in an industrial control and automation system, various changes may be made to FIG. 6. For example, some steps in the method 600 could be optional, such as steps 610-612. Also, while shown as a series of steps, various steps in FIG. 6 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
    a wireless leaf node configured to modify operation of an industrial process; and
    a plurality of wireless access points configured to transmit data to the wireless leaf node in specified time slots within a data frame and to receive an acknowledgement from the wireless leaf node in response to successful receipt of the data by the wireless leaf node, wherein a first one of the access points is configured to:
    transmit a first data message to the wireless leaf node during a first portion of a first time slot; and
    in response to determining that no acknowledgement is received to the transmission of the first data message, perform a first retransmission of the first data message to the wireless leaf node during a second portion of the first time slot;
    transmit a second data message to the wireless leaf node during a first portion of a second time slot; and
    in response to determining that no acknowledgement is received to the first retransmission, determine whether to perform a second retransmission of the first data message to the wireless leaf node after the first portion of the second time slot during a second portion of the second time slot based on whether an acknowledgement is received to the transmission of the second data message and a priority order for message retransmissions.

2. The system of claim 1, wherein a second one of the access points is configured to:
    transmit a third data message to the wireless leaf node during the first portion of the first time slot;
    if no acknowledgement is received, retransmit the third data message to the wireless leaf node during the second portion of the first time slot; and
    if no acknowledgement is received, retransmit the third data message to the wireless leaf node after the first portion of the second time slot during the second portion of the second time slot.

3. The system of claim 2, wherein the first and second access points are further configured to:
    receive a ping from the wireless leaf node before transmitting to the wireless leaf node during at least one of the first and second time slots.

4. The system of claim 1, wherein a second one of the access points is configured to transmit a chirp or dummy message to the wireless leaf node during at least one of the first and second time slots.

5. The system of claim 1, wherein a second one of the access points is configured to:
   transmit a third data message to the wireless leaf node during a first portion of a third time slot; and
   if no acknowledgement is received, retransmit the third data message to the wireless leaf node at least one of: during a second portion of the third time slot and after a first portion of a fourth time slot during a second portion of the fourth time slot.

6. The system of claim 1, wherein:
   a second one of the access points is configured to transmit a third data message to the wireless leaf node during the first time slot;
   if no acknowledgement is received, the second access point is configured to retransmit the third data message to the wireless leaf node after a first portion of a third time slot during a second portion of the third time slot;
   if no acknowledgement is received, the first access point is configured to retransmit the first data message to the wireless leaf node after a first portion of a fourth time slot during a second portion of the fourth time slot; and
   if no acknowledgement is received, the second access point is configured to retransmit the third data message to the wireless leaf node after a first portion of a fifth time slot during a second portion of the fifth time slot.

7. The system of claim 1, wherein the wireless leaf node comprises a wireless actuator.

8. The system of claim 1, wherein each access point comprises a local slot manager configured to assign the specified time slots for that access point to communicate with the wireless leaf node.

9. The system of claim 8, wherein each local slot manager is configured to assign multiple time slots to the wireless leaf node in response to a multi-slot request from the wireless leaf node.

10. The system of claim 8, wherein each local slot manager is configured to assign one time slot to the wireless leaf node in response to each of multiple slot requests from the wireless leaf node.

11. An access point comprising:
   at least one transceiver configured to transmit data to a wireless leaf node that is configured to modify operation of an industrial process and to receive an acknowledgement from the wireless leaf node in response to successful receipt of the data by the wireless leaf node; and
   a controller configured to initiate transmission of the data to the wireless leaf node in specified time slots within a data frame and to identify the specified time slots in cooperation with a second access point that is configured to transmit the data to the wireless leaf node;
   wherein the controller is configured to identify the time slots such that the access point is configured to:
      transmit a first data message to the wireless leaf node during a first portion of a first time slot;
      in response to determining that no acknowledgement is received to the transmission, perform a first retransmission of the first data message to the wireless leaf node during a second portion of the first time slot;
      transmit a second data message to the wireless leaf node during a first portion of a second time slot; and
      in response to determining that no acknowledgement is received to the first retransmission, determine whether to perform a second retransmission of the first data message to the wireless leaf node after the first portion of the second time slot during a second portion of the second time slot based on whether an acknowledgement is received to the transmission of the second data message and a priority order for message retransmissions.

12. The access point of claim 11, wherein the controller is configured to assign the time slots such that the access point is configured to:
   allow the second access point to transmit a third data message to the wireless leaf node during the first portion of the first time slot;
   if no acknowledgement is received to the transmission, allow the second access point to retransmit the third data message to the wireless leaf node during the second portion of the first time slot; and
   if no acknowledgement is received to the retransmission, allow the second access point to retransmit the third data message to the wireless leaf node after the first portion of the second time slot during the second portion of the second time slot.

13. The access point of claim 11, wherein the controller is further configured to identify reception of a ping from the wireless leaf node before initiating transmission to the wireless leaf node during at least one of the first and second time slots.

14. The access point of claim 11, wherein the controller is configured to assign the time slots such that the access point is configured to:
   allow the second access point to transmit a chirp or dummy message to the wireless leaf node during the first portion of the first time slot;
   if no acknowledgement is received to the transmission, allow the second access point to retransmit the chirp or dummy message to the wireless leaf node during the second portion of the first time slot; and
   if no acknowledgement is received to the retransmission, allow the second access point to retransmit the chirp or dummy message to the wireless leaf node after the first portion of the second time slot during the second portion of the second time slot.

15. The access point of claim 11, wherein the controller is configured to assign the time slots such that the access point is configured, if no acknowledgement to the second retransmission is received, to allow the second access point to transmit a third data message to the wireless leaf node at least one of: during a first portion of a third time slot, during a second portion of the third time slot, and after a first portion of a fourth time slot during a second portion of the fourth time slot.

16. The access point of claim 11, wherein the controller is configured to assign the time slots such that the access point is configured to:
   allow the second access point to transmit a third data message to the wireless leaf node during the first time slot;
   if no acknowledgement is received, allow the second access point to retransmit the third data message to the wireless leaf node after a first portion of a third time slot during a second portion of the third time slot;
   if no acknowledgement is received, retransmit the first data message to the wireless leaf node after a first portion of a fourth time slot during a second portion of the fourth time slot; and
   if no acknowledgement is received, allow the second access point to retransmit the third data message to the wireless leaf node after a first portion of a fifth time slot during a second portion of the fifth time slot.

17. The access point of claim 11, wherein the controller is configured to assign multiple time slots to the wireless leaf node in response to a multi-slot request from the wireless leaf node.

18. The access point of claim 11, wherein the controller is configured to assign one time slot to the wireless leaf node in response to each of multiple slot requests from the wireless leaf node.

19. A method comprising:
- transmitting a first data message to a wireless leaf node during a first portion of a first time slot, wherein the wireless leaf node is configured to modify operation of an industrial process;
- in response to determining that no acknowledgement is received to the transmission, performing a first retransmission of the first data message to the wireless leaf node during a second portion of the first time slot;
- transmitting a second data message to the wireless leaf node during a first portion of a second time slot; and
- in response to determining that no acknowledgement is received to the first retransmission, determining whether to perform a second retransmission of the first message to the wireless leaf node after the first portion of the second time slot during a second portion of the second time slot based on whether an acknowledgement is received to the transmission of the second data message and a priority order for message retransmissions,
- wherein a plurality of wireless access points are configured to transmit data to the wireless leaf node in specified time slots within a data frame and to receive an acknowledgement from the wireless leaf node in response to successful receipt of the data by the wireless leaf node.

20. The method of claim 19, further comprising:
- transmitting a third data message to the wireless leaf node during the first portion of the first time slot;
- if no acknowledgement is received, retransmit the third data message to the wireless leaf node during the second portion of the first time slot; and
- if no acknowledgement is received, retransmit the third data message to the wireless leaf node after the first portion of the second time slot during the second portion of the second time slot.

* * * * *